No. 865,748. PATENTED SEPT. 10, 1907.
J. H. AUBLE.
CONVEYER FOR LAWN MOWING MACHINES.
APPLICATION FILED DEC. 7, 1905.
2 SHEETS—SHEET 1.
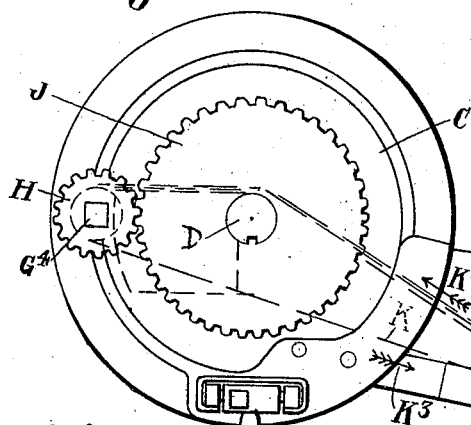
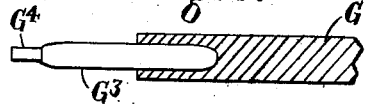
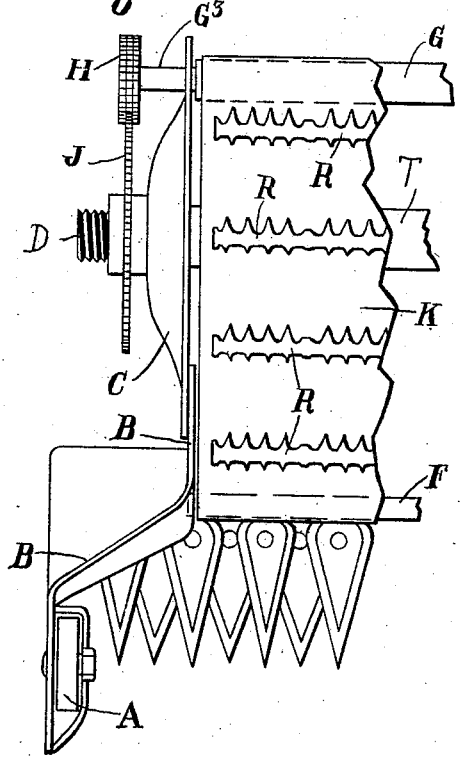
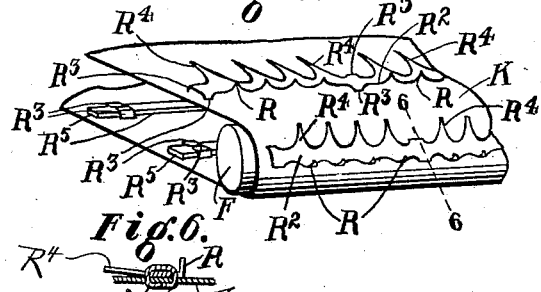
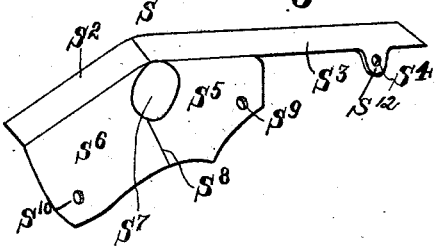
WITNESSES:
Alois N. Verdin
K. Smith
INVENTOR.
James H. Auble
BY Jno. Hubbell Fisher
ATTORNEY.
THE NORRIS PETERS CO., WASHINGTON, D. C.

No. 865,748. PATENTED SEPT. 10, 1907.
J. H. AUBLE.
CONVEYER FOR LAWN MOWING MACHINES.
APPLICATION FILED DEC. 7, 1905.
2 SHEETS—SHEET 2.
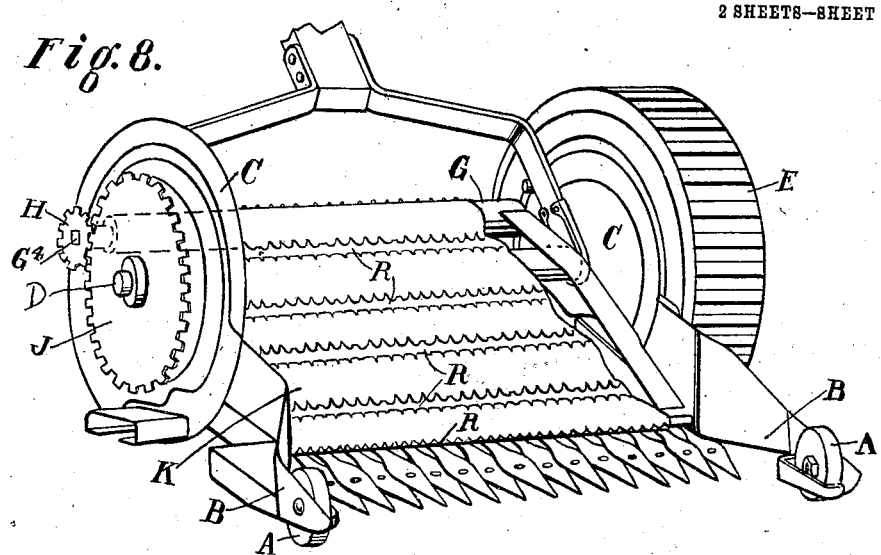
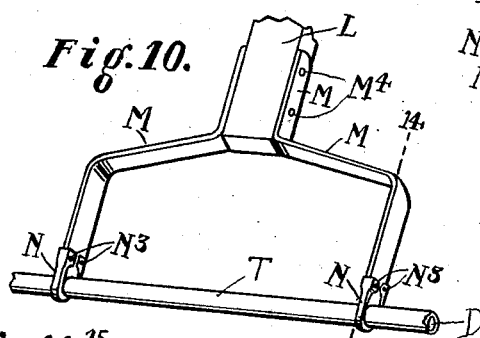
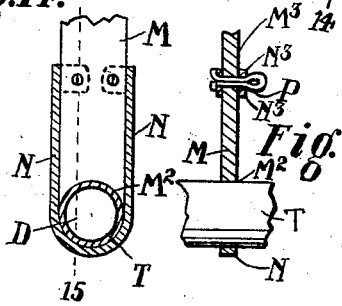
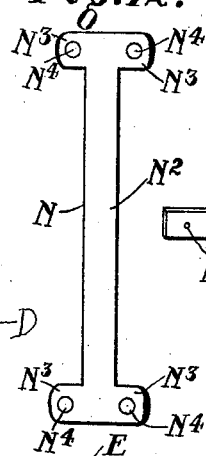
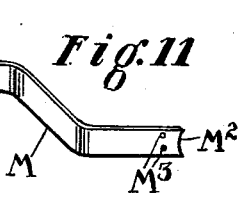
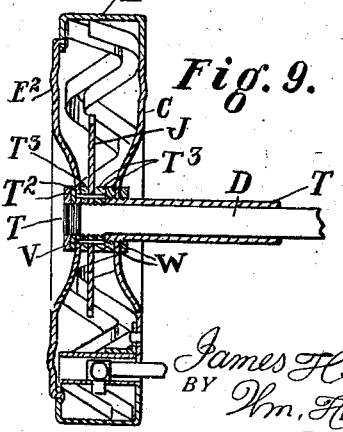
WITNESSES:
Alois N. Verdin
R. Smith
INVENTOR
James H. Auble
BY Wm. Hubbell Fisher
ATTORNEY.
THE NORRIS PETERS CO., WASHINGTON, D. C.

UNITED STATES PATENT OFFICE.

JAMES H. AUBLE, OF CINCINNATI, OHIO, ASSIGNOR OF TWO-THIRDS TO JACOB H. BROMWELL, OF WYOMING, OHIO, AND JAMES J. McDONALD, OF CINCINNATI, OHIO.

CONVEYER FOR LAWN-MOWING MACHINES.

No. 865,748.  Specification of Letters Patent.  Patented Sept. 10, 1907.

Application filed December 7, 1905. Serial No. 290,767.

*To all whom it may concern:*

Be it known that I, JAMES H. AUBLE, a citizen of the United States, and a resident of the city of Cincinnati, in the county of Hamilton and State of Ohio, have invented certain new and useful Improvements in Conveyers for Lawn-Mowing Machines, of which the following is a specification.

The several features of my invention and the various advantages resulting from their use conjointly or otherwise will be apparent from the following description and claims.

In the accompanying drawings making a part of this application,—Figure 1 is a side elevation of a lawn mower, illustrating my invention, the outer central portion of the wheel being removed. Fig. 2 is a top view of a portion of this lawn mower. Fig. 3 is a view partly in section and partly in elevation of a portion of one of the shafts or rolls on which the apron for delivering the cut grass at the rear of the machine is supported and by which it is operated, and illustrating the preferred construction for sustaining this shaft at one end and also for there unshipping it. Fig. 4 shows partly in section and partly in elevation the other end of the shaft or roll shown in Fig. 3 and the preferred device for there sustaining it. Fig. 5 is a view in perspective of a portion of the apron and the front roller for supporting this apron. Fig. 6 is a view in section taken through the apron in the plane of the dotted line 6, 6, of Fig. 5. Fig. 7 is a view in perspective of one of the end guides for supporting the apron, and its supporting plates. Figs. 5, 6 and 7 are made upon a scale larger than that of Figs. 1 and 2. Fig. 8 is a view in perspective of a portion of a lawn mower illustrating my invention. Fig. 9 is a vertical, central transverse section of one of the main wheels, the gear operated by it, the stationary sleeve shaft which embraces the solid or rotatory shaft; the latter as well as that part of the reciprocatory bar which is employed to impart motion to the mechanism for moving the cutters being shown in elevation. Fig. 10 shows, in perspective, and on a diminished scale, a new and valuable mode of connecting the handle to the driving axle. Fig. 11 shows in perspective one of the duplicate iron branches of this handle. Fig. 12 is an elevation, on a large scale, of one of the strap pieces which, when further shaped as hereinafter described, is employed to hold a branch iron of the handle to the connection between the disks which latter are respectively located adjacent to their respective driving wheels. Fig. 13, on a large scale, shows one of the spring keys, such as are preferably employed to hold the strap pieces to the branch irons of the handle. Fig. 14 is a view, enlarged, of a portion of the branch iron of the handle, of the strap iron which fits the latter, and of the shaft to which these former are connected. In this figure, the branch iron is in elevation, but the strap irons and shaft are shown in section, this section being taken in the plane of the dotted line 14, 14, of Fig. 10. Fig. 15 shows, on the same large scale, this shaft, strap iron and branch iron and spring key together, the branch iron and a part of the strap being shown in section. This section is taken in the plane of the dotted line 15, 15, of Fig. 14.

I will now proceed to describe my invention in detail.

The machine relates to that class of machines where the main weight of the mechanism is supported on two driving wheels. If the forward portion of the machine needs any other support from the earth, the machine may there be supported on runners, which slide over the ground, or on small wheels. The use of such runners, and also the use of small wheels is old in the art of mechanism for lawn mowers, and does not need to be particularly described herein.

In the machine illustrated in the drawings, I have shown auxiliary ground wheels A, for supporting the forward portion of the cutting knife frame B. This frame B extends back and is duly connected to a disk C. There are two disks C, one on each side of the machine. Each of these disks C is supported on the main axle shaft D. These disks C are respectively adjacent to their respective main wheels E. Each of the main wheels E is connected to the shaft D, substantially as shown in Fig. 8. The constructions mentioned are symmetrical at both ends of the machine. In the frame B, I journal the rod or roller F. One end of this roller F thus journaled is shown in Figs. 1 and 2. The other end of this roller is journaled in the corresponding part of the frame, at the other side of the machine. In the rear lower portion of one of the disks C is journaled one end of a shaft G. The other end of this shaft is journaled in the corresponding disk C at the other side of the machine. The shaft G is to be positively driven, so I extend the roller at one end beyond the adjacent disk C, and fix thereon a gear-wheel H. On the main shaft D, which is driven by the main wheels E, I fix a gear wheel J, and the teeth of the latter engage the teeth of the gear H. The rotation of the gear J rotates the gear H, and consequently rotates the shaft G.

Between and upon the roll F and upon the shaft G, I place an endless apron K. This apron runs around each roll and is indicated by dotted lines in Fig. 1 and by solid lines in Fig. 2. The rotation of the shaft G moves the apron, and when the machine is advancing, namely: in the direction of the arrow Z, Fig. 1, that part of the apron which is uppermost will move backward as shown by the arrow $K^2$, while that part thereof which is underneath will run forward as indicated by the arrow $K^3$. Thus when the machine is advancing, the grass, etc., cut by the knives will fall upon the forward portion of the upper part of the apron and be carried backward on the moving apron and be deposited at the rear of the machine, and behind the apron. If a basket or other catchall be placed at and below the apron at the rear part of it, the grass and leaves will fall therein. Otherwise they will fall on the ground. But in either event, this grass, etc., will be carried back from the knives and cannot interfere with their working. The roll F may be rotatable or be stationary. If stationary, it should be smooth so that the apron may easily slip around it. I combine with the apron K the teeth R. These are formed on a shank piece $R^2$, which extends crosswise on the apron. This shank is held fast to the apron by the clenching prong $R^3$, $R^3$. These are present at intervals, and preferably in pairs, one tooth at one edge of the shank, and another tooth at the opposite edge of the shank. The teeth $R^3$ are passed through the material of the apron, and are bent beneath the apron and underneath where the shank is located above. To give the teeth and shank a desired purchase on the apron, a rod $R^5$ is located on the inside of the apron opposite where the shank lies on the outside of the apron, and the teeth $R^3$ are clenched over this bar. The teeth on one side of the shank project up at right angles to the plane of the apron. The shank $R^2$ is further provided with teeth or projections $R^4$ preferably pointed which extend rearward on the apron. These projections $R^4$ have among their functions that of steadying the shanks $R^2$ and the teeth R. When the apron is in operation, the teeth are carried up at the front and rearward with the upper part of the apron. When the grass cut by the knives falls on the apron, and is carried by the latter rearward, the teeth materially aid in preventing the apron slipping beneath the grass, and compels all of the grass to move rearward, for discharge at the back end of the machine.

For purposes of economy, I prefer to make the shaft G compound. I make the main part of the shaft G of wood. At one end of the shaft G, I place the metal rod $G^2$ which rotates in its adjacent disk. I drive this rod $G^2$ into the wooden shaft. At the other end of this wooden shaft, I locate the metal rod $G^3$ and I drive this into the wooden shaft. This metal rod $G^3$ rotates in its adjacent disk. I square the outer portion of this rod $G^3$ at $G^4$. On this squared portion I locate the gear wheel H aforementioned. Of course, if the rod $G^3$ at $G^4$ is left round, a key can be used to fix the gear H on the shaft, but my aforementioned construction is more simple. I prefer to make the gear H thicker than the gear J, because then if there be longitudinal play of the shaft D, or of the shaft G (the latter is more common), the gear H cannot get out of engagement with the gear J. I thicken this gear by putting three such gears side by side, and fastening them rigidly together. Such a mode of constructing this gear is a very simple and cheap one. I can easily make the triplicate pieces by stamping them out of thin metal.

In the preferred construction, the main shaft D is rotatable with the wheels, and a sleeve shaft T embraces the main shaft substantially as shown. The side or discal portion $E^2$ of the wheel E is located on the shaft D, and is on this shaft between the nuts $T^2$ at the outside, and the nuts or washers $T^3$ at the inside of the shaft. The latter nuts or washers are firmly fixed on the shaft. Locking bolts V extending through these nuts or washers $T^3$ and the side portion $E^2$ hold these together and compel the shaft and these to turn together. Of the outside nuts $T^3$, one is screwed tightly against the disk and the other (a set nut) is screwed against the first named nut.

The stationary disk C, which it will be remembered is connected to the frame, is on the sleeve. The nuts or washers W fixed on the sleeve in front and behind the disk hold and prevent it from moving laterally on the sleeve. At the end where the gear J is present, this gear takes the place of one of the washers or nuts $T^3$, substantially as indicated in Fig. 8.

The handle is connected to the sleeve T, see Figs. 8, 10 and 14. L indicates the shank of the handle, and M, M, the branch irons of the handle. These branch irons M, M, are connected to the sleeve T, as follows: The free end of each branch iron is concaved at $M^2$, so as to receive and fit a portion of the round of the sleeve T, see Figs. 10, 11 and 14. I provide strap irons N, and these I shape as follows: The main portion $N^2$ of the strap iron is straight and of even width. At each end of this iron N, I form ears $N^3$, one on each edge of the iron N, see Figs. 10, 12, 14 and 15. Each ear $N^3$ has a hole $N^4$ through it. Each branch iron M has two holes through it, which holes respectively aline with the respective holes $N^4$, $N^4$ of the ears $N^3$, $N^3$. In practice, these ears are bent forward in the same direction, until their side surfaces are in planes at right angles to the planes of the longitudinal edges of the main part of the strap iron. The bending line of each ear is the dotted line next to it. The straps thus formed are bent in a curve at their midlength, and are then located on the respective branch irons, as follows: The sleeve T is received into the concaved part $M^2$ of the branch iron M. The strap N is next placed over the sleeve T and moved up so that it lies against the edges of the branch iron M, and the strap and its ears $N^3$, at one end of it (the strap iron) embrace the branch iron at and near one edge, and the strap and its ears $N^3$ at the other end embrace the branch iron at and near the other edge of the latter. Securing pins, bolts or split keys (preferably the latter) P are passed through the holes $N^3$ of a pair of ears and the adjacent hole $M^3$ of the branch iron; a securing key being at each end of the branch iron. The branch irons are thus secured to the sleeve T, see Figs. 8, 10 and 15. The construction I thus provide for securing the handle to the sleeve T and for separating it therefrom is a simple and economical one. The device enables the handle to be quickly and easily connected to the sleeve T, and as quickly and readily disconnected therefrom.

The branch irons M, M are properly secured to the handle L, preferably by rivets or bolts entering the handle L, through holes $M^4$ in the branch irons. In cases where the wheels are journaled on the main shaft, and the latter is stationary and is connected to the frame directly or by intermediate means, the sleeve can be dispensed with, and the branch irons of the handle can and ordinarily will be made to embrace the shaft. Their mode of contact will not differ from that herein described. In the claims, the sleeve where mentioned will in such cases be considered so far as the handle branch irons and straps are concerned, to be the same as a shaft.

Guides S, S, for supporting the middle portion of the apron are present, one at each side of the machine. Each guide S has two adjacent flat portions $S^3$ and $S^2$, the part $S^2$ being at the rear of the machine main shaft, and the part $S^3$ being in front of this shaft. The part $S^3$ has a flange $S^{12}$ which receives at $S^4$ a bolt, which connects it to a part of the framework B. It has another flange $S^5$, which is connected to the disk C by a rivet at $S^9$. The part $S^2$ has a flange $S^6$ which is connected to the disk C by a rivet at $S^{10}$. This entire guide is preferably formed out of a single piece of metal, stamped to shape. When such is the case, the flanges $S^5$ and $S^6$ must be separated at a line $S^8$, to allow the same to be temporarily put apart while and until the main shaft is introduced into the opening $S^7$ of this guide. This guide is easily constructed and is very efficient in use. The upper portion of the apron coming from the roller moves on over and upon the guide and reaches the rear roller G.

What I claim as new, and of my invention and desire to secure by Letters Patent, is:—

1. The apron, composed of the sheet of textile fabric, and extended strips of metal located thereon at right angles to the direction of the movement of the sheet, these strips of metal having teeth extending at an angle out from these strips, and clenching teeth bent and passed through the textile sheet, and bent inside the sheet, substantially as and for the purposes specified.

2. The apron, composed of the sheet of textile fabric, and extended strips of metal located thereon at right angles to the direction of the movement of the sheet, these strips of metal having teeth extending at an angle out from these strips, and clenching teeth bent and passed through the textile sheet, a bar located on the inside of the sheet opposite the said strip, the teeth of the strip bent around the bar, substantially as and for the purposes specified.

3. A conveyer comprising an endless belt, metal strips secured transversely thereon, said strips having teeth thereon extending parallel to the belt and teeth extending at an angle thereto.

JAMES H. AUBLE.

Attest:
  JOHN E. FITZPATRICK,
  K. SMITH.